(12) United States Patent
Hiraguchi

(10) Patent No.: US 6,866,216 B2
(45) Date of Patent: Mar. 15, 2005

(54) CARTRIDGE

(75) Inventor: Kazuo Hiraguchi, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/386,508

(22) Filed: Mar. 13, 2003

(65) Prior Publication Data

US 2003/0173439 A1 Sep. 18, 2003

(30) Foreign Application Priority Data

Mar. 15, 2002 (JP) ........................................ 2002-072986

(51) Int. Cl.⁷ .......................................... G11B 23/107
(52) U.S. Cl. .................... 242/348.2; 360/132
(58) Field of Search ............................. 242/348, 348.2, 242/344; 360/132, 95, 131, 133, 134

(56) References Cited

U.S. PATENT DOCUMENTS

| | | | |
|---|---|---|---|
| 4,734,812 A | * 3/1988 | Tanaka et al. | 242/344 |
| 5,218,502 A | * 6/1993 | Tanaka et al. | 360/132 |
| 5,239,437 A | * 8/1993 | Hoge et al. | 360/132 |
| 5,253,821 A | * 10/1993 | Johnson | 242/348 |
| 5,371,644 A | 12/1994 | Hoge et al. | |
| 5,504,644 A | * 4/1996 | Sasaki et al. | 360/132 |
| 6,466,405 B1 | * 10/2002 | Rambosek | 360/132 |

* cited by examiner

*Primary Examiner*—William A. Rivera
(74) *Attorney, Agent, or Firm*—Sughrue Mion, PLLC

(57) ABSTRACT

A recording tape cartridge is formed by joining together respective peripheral walls of an upper case and a lower case, and an label area is disposed at a rear wall of the upper case. An operational hole, for switching between a mode in which recording onto the recording tape is possible and a mode in which recording onto the recording tape is not possible, and an identification opening are disposed on a rear wall of the lower case. An operational portion and an identification portion of a mistaken erasure prevention plug are respectively exposed at the rear wall of the lower case. The identification opening opens downward and rearward with respect to the case. By operating the operational portion, the identification portion of the plug moves and the opening is opened and closed. By distinguishing between opened and closed states of the opening, the recordable and non-recordable modes are identified.

20 Claims, 10 Drawing Sheets

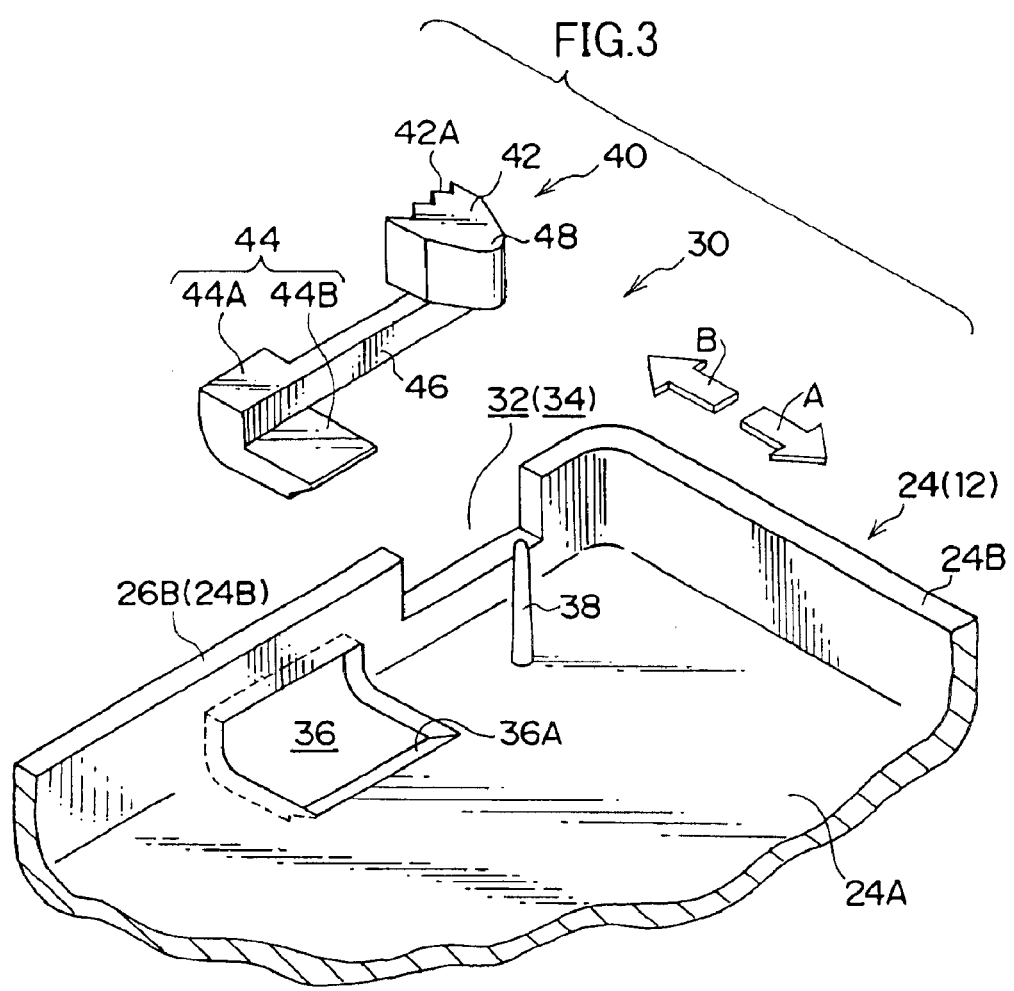

CARTRIDGE

BACKGROUND OF THE INVENTION

1. Field of the Invention

The present invention relates to a cartridge that houses a recording medium in a case and is disposed with a write-protect function that switches between a state in which it is possible to record to the recording medium and a state in which it is not possible to record to the recording medium.

2. Description of the Related Art

In a cartridge that houses within a case a recording medium, such as a disc medium or recording tape wound around a reel, a write-protect portion is disposed for preventing erasure of data recorded on the recording medium. The write-protect portion is generally disposed on a rear surface side of the case so that whether or not it is possible to recording to the recording medium can be identified with the eye in a state in which the cartridge is stacked in a thickness direction and in a state in which the cartridge is housed in a holder of a library device. A label area for affixing a label, on which is written the content (e.g., title) recorded on the recording medium, is disposed on the rear surface of the case.

Such a cartridge will be described below on the basis of FIGS. 10A and 10B. In FIG. 10A is shown an oblique perspective view of a rear surface (rear) side portion of a cartridge 100 seen obliquely from below. The cartridge 100 comprises a hollow case 102, which is formed by mutual peripheral walls of an upper case 102A and a lower case 102B being put together and within which is housed a single reel wound with magnetic tape.

A write-protect portion 104 is disposed on the rear surface side of the case 102, which is opposite to a side loaded into a library device. The write-protect portion 104 includes an opening 108 that passes through a rear wall 106 of the case 102. The opening 108 comprises rectangular cutouts 108A and 108B respectively disposed in the upper case 102A and in the lower case 102B, and is positioned across a parting line PL. A long hole 112 is disposed in the width direction of the case 102 (longitudinal direction of the rear wall 106) in a bottom panel 110 of the lower case 102B.

The write-protect portion 104 also includes a mistaken erasure prevention plug 114 that serves as a changeable member. The mistaken erasure prevention plug 114 includes an operational protrusion 116, which is slidably disposed at an inner side of the rear wall 106 and projects into the opening 108, and an identification protrusion 118, which projects into the long hole 112.

By operating the operational protrusion 116 and sliding the mistaken erasure prevention plug 114 in the longitudinal direction of the rear wall 106, the mistaken erasure prevention plug 114 is alternatively switched between a recordable state that allows a drive device to record information onto the magnetic tape and an non-recordable state that makes it impossible for (forbids) the drive device to record information onto the magnetic tape (i.e., a prohibited state).

Specifically, in the cartridge 100, when the identification protrusion 118 is positioned at the arrow D side of the long hole 112, as shown in FIG. 10A, the mistaken erasure prevention plug 114 is placed in the non-recordable (prohibited) state, and when the identification protrusion 118 is positioned at the arrow E side of the long hole 112, as shown in FIG. 10B, the mistaken erasure prevention plug 114 is placed in the recordable state. That is, when it is identified at the drive device by optical identification means or by mechanical identification means resulting from contact with a pin that the arrow D side of the long hole 112 is closed off by the identification protrusion 118, recording of information onto the magnetic tape is not allowed. In this manner, the drive device generally identifies from below the case 102 whether or not recording is possible.

In the non-recordable state, the opening 108 is closed off by the mistaken erasure prevention plug 114, and in the recordable state, a through hole 120 disposed in the mistaken erasure prevention plug 114 further to the arrow D side than the operational protrusion 116 corresponds to the opening 108, and the opening 108 is opened. Thus, the user can visually confirm from the rear surface side of the cartridge 100 whether the cartridge 100 is in the non-recordable state or in the recordable state (i.e., whether or not recording is possible). Moreover, a mark 122 (e.g., a graphic representing a closed lock) representing the fact that the cartridge 100 is in the non-recordable state is disposed at a portion of the mistaken erasure prevention plug 114 that closes off the opening 108 in the non-recordable state, to thereby prevent mistaken confirmation on the part of the user.

A label area 124, which is rectangular when seen from the rear surface, is disposed slightly away from the opening 108 on the rear wall 106. The label area 124 comprises recesses 124A and 124B respectively disposed in the upper case 102A and in the lower case 102B, and the parting line PL is positioned at a substantial center of the label area 124. By disposing the write-protect portion 104 near a left end (the end in the direction of arrow E) of the rear wall 106, it is possible to affix a large label in the longitudinal direction of the rear wall 106.

In this manner, in the cartridge 100, because the write-protect portion 104 and the label area 124 are disposed in the rear wall 116 that forms the rear surface of the case 102, the user can identify information recorded on the label and whether or not recording on the cartridge 100 is possible, and can operate the mistaken erasure prevention plug 114 to switch between the recordable and non-recordable states, even if only the rear surface of the cartridge 100 is exposed due to the cartridge 100 being stacked in the thickness direction or housed in a holder of a library device.

It is preferable for the label area 124 to be as large as possible. In particular, it is preferable for the label area 124 to be as long as possible in the longitudinal direction of the rear wall 106. It is also preferable for the write-protect portion 104 to be maintained in a state in which it is possible for the drive device to confirm from below the case 102 whether or not recording is possible, for it to be possible to visually confirm from the rear surface side of the case 102 whether or not recording of the cartridge 100 is possible, and for it to be possible to switch between the recordable and non-recordable states by operating the mistaken erasure prevention plug 114 from the rear side surface.

However, in the above-described conventional cartridge 10, it has not been possible to increase the longitudinal dimension of the label area 124, because the label area 124 and the opening 108 of the write-protect portion 104 are adjacently disposed in the longitudinal direction of the rear wall 106. Also, because the label area 124 is disposed across the parting line PL in order to increase its size, the step created by the parting line PL has been an obstacle to writing characters on the label and reading those characters.

SUMMARY OF THE INVENTION

In view of the above-described facts, it is an object of the invention to provide a cartridge in which it is possible to visually confirm from a rear surface of a case whether information can be recorded on a recording medium, to switch between a recordable state and a non-recordable state by operation from the rear surface of the case, i.e., from a rear surface side of the case, and to increase the length of a label area disposed on the rear surface (back surface) of the case.

In order to achieve this object, a first aspect of the invention is a recording medium cartridge for housing a recording medium, being used by being loaded into a drive device from a predetermined direction, and alternatively including a mode in which recording onto the recording medium is possible and a mode in which recording onto the recording medium is prohibited, the recording medium cartridge including a cartridge case that is substantially formed from an upper case and a lower case that respectively include a base panel and a wall enclosing a periphery of the base panel, with the walls of the upper case and the lower case being mutually joined together to house therein the recording medium, and rear sides, with respect to said predetermined direction, of the walls of the upper case and the lower case, having a substantially rectangular shape including a predetermined width and respective predetermined heights, wherein one of the upper case and the lower case includes a first opening formed in a rear side wall thereof, a second opening formed in the rear side wall thereof apart from the first opening in a width direction, a third opening formed in the base panel thereof, a switching member that is disposed in the first and third openings so as to be movable in the width direction and switches open and closed states of the first and third openings depending on positions of the switching member, and an operational member that is disposed connectedly with the switching member so that an operation in which said operational member is moved from the outside is possible, and exposed through the second opening, whereby the modes can be identified by the open and closed states of the first and third openings being distinguished from the outside.

A surface that is recessed in a substantially rectangular shape is formed in the rear side wall of the other of the upper case and the lower case, and a label is affixable to the recessed surface. The height of the wall of the other of the upper case and the lower case can be made greater than the wall of the one of the upper case and the lower case.

The first and third openings can form a continuous single opening or be formed apart from each other.

The one of the upper case and the lower case can include a cutout and be joined together with the other of the upper case and the lower case to thereby form the second opening.

In the cartridge of the first aspect of the invention, the operational member exposed through the second opening is operated and the switching member is moved in the longitudinal direction of the rear surface of the case, whereby the first opening and the third opening are opened or closed off, and the state in which information can be recorded onto the recording medium housed in the case and the state in which information is prohibited from being (cannot be) recorded onto the recording medium are switched. The content written on the label affixed to the label area disposed on the rear surface side peripheral wall of the case is visually confirmed.

The switched states resulting from the movement of the switching member can be identified visually and by identification means (drive device or the like) from both of the rear surface, i.e., the back surface side of the case disposed with the first opening and the upper surface or the lower surface side of the case disposed with the third opening. It is possible to switch the states in which recording is possible and recording is impossible from the rear surface side by operating the operational portion of the switching member exposed through the second opening disposed in the rear surface side of the case.

Moreover, because the label area is disposed in the rear surface side peripheral wall of one of the upper case and the lower case, and the second opening through which the operational portion of the switching member is exposed and the first opening that is opened and closed by the switching member are disposed in the rear surface side peripheral wall of the other of the upper case and the lower case, the label area can be disposed across the substantial entire longitudinal-direction length in the rear surface side peripheral wall of the upper case or the lower case.

Because the first opening and the second opening are disposed on the other (the one that is not disposed with the label area) of the upper case and the lower case apart in the longitudinal direction of the peripheral wall (rear surface), i.e., because the operational portion and the portion of the switching member that opens and closes the first opening are disposed in a line in a substantially horizontal direction, it is possible to suppress the height of at least the portion of the switching member exposed to the rear surface side of the case. Thus, for example, the peripheral wall of the one of upper case and the lower case disposed with the label area can be heightened, and it is also possible to enlarge the height of the label area without increasing the thickness of the case.

Moreover, because the label area is disposed on one of the upper case and the lower case, the label area can be formed flatly without a step and without disposing the label area across the parting line that is the juncture between the mutual peripheral walls of the upper case and the lower case. For this reason, the ability with which information can be written on and read from the label affixed to the label area is improved.

In this manner, in the cartridge of the first aspect of the invention, whether or not it is possible to record information onto the recording medium can be visually confirmed from the rear surface of the case, the modes in which recording is possible and impossible can be switched by operation from the rear surface side of the case, and the length of the label area disposed on the rear surface of the case can be enlarged.

In the cartridge having this structure, because it is possible to confirm the switched state from the first opening and second opening, the cartridge can be used in a drive device (identification means) of a different specification that confirms the switched state from a different direction. Also, it is preferable to confirm whether or not it is possible to record onto the recording medium of the case in a library device in which plural cartridges are housed in holders and automatically (without the intervention of humans hands) loaded into and removed from plural drive devices. By identifying the switched state from the rear surface side of the case of the cartridge using identifying means that can move between the holders, it is possible to identify, with a realistic structure in which identification means is not disposed in each holder, whether or not recording is possible before the recording tape cartridge is loaded into the drive device.

Moreover, in the cartridge having each of these structures, if a structure is adopted in which the first opening and the third opening are connectedly disposed at a corner where the rear surface and an upper surface or a lower surface meet, it is possible to increase the area of the portion that can be seen from the rear surface side of the switching member only by the amount of the thickness of the case, and the visibility of the portion, which can be seen, is improved.

BRIEF DESCRIPTION OF THE DRAWINGS

FIG. 3 is an exploded perspective view of the write-protect portion of the recording tape cartridge pertaining to the embodiment of the invention;

DESCRIPTION OF THE PREFERRED EMBODIMENT

A recording tape cartridge 10 pertaining to an embodiment of the invention will be described on the basis of FIGS. 1 through 6. For convenience of explanation, the direction in which the recording tape cartridge 10 is loaded into a drive device, which direction is indicated by arrow A, will be referred to as the front direction (front side) of the recording tape cartridge 10, and the direction of arrow B, which is opposite to the direction of arrow A, will be referred to as the rear direction (rear surface side). The expressions front/back, left/right, and upper/lower will be made using as a reference an instance where the recording tape cartridge 10 is seen while facing the direction of arrow A.

Figure 1:
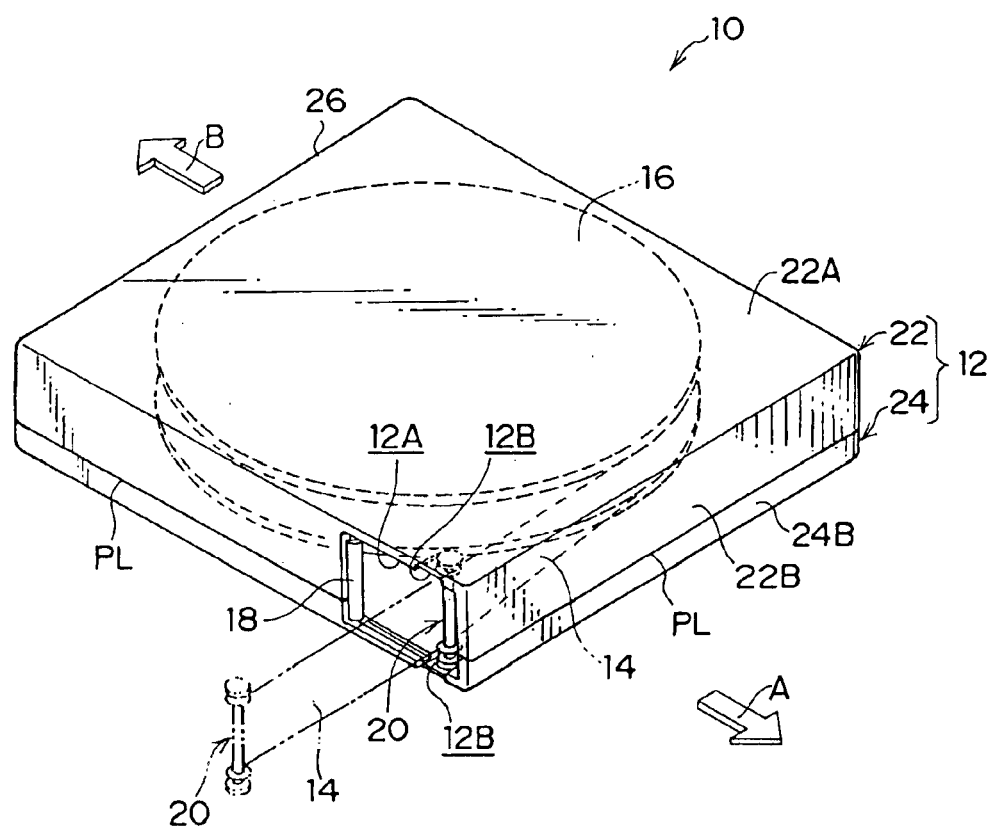
FIG. 1 is an oblique perspective view showing the overall structure of a recording tape cartridge pertaining to an embodiment of the invention.

In FIG. 1, the schematic overall structure of the recording tape cartridge 10 is shown in an oblique perspective view. As shown in the drawing, the recording tape cartridge 10 includes a cartridge case 12 (referred to as "the case 12" below), which is substantially rectangular when seen in plan view and rotatably houses therein a single reel 16 around which is wound magnetic tape 14 that serves as recording tape and is a medium for recording and playing back information.

A gear opening through which is exposed a reel gear (both not illustrated) of the reel 16 is disposed in a lower surface of the case 12. The reel 16 is rotatably driven within the case 12 by the reel gear meshing with a drive gear of a drive device.

An opening 12A that is opened and closed off by a sliding door 18 is formed in a front end of a right side surface of the case 12, and is for pulling out the magnetic tape 14. A pair of upper and lower recesses 12B is disposed at an inner side of the opening 12A of the case 12. Both ends of a lead pin 20, which is connected to a leading end of the magnetic tape 14, are retained in the recesses 12B.

The lead pin 20 is connected to the magnetic tape 14 in a state in which both ends of the lead pin 20 project further out than width-direction edges of the magnetic tape 14. These projecting ends are retained in the recesses 12B and engage with (are caught by) pull-out means of a drive device when the magnetic tape 14 is pulled out from the case 12.

The above-described case 12 is formed in a substantially square box shape by joining together an upper case 22 and a lower case 24 that are each made by resin-molding. Specifically, the upper case 12, which includes an upper peripheral wall 22B and a top panel 22A that serves as a base panel, and the lower case 24, which includes a lower peripheral wall 24B and a bottom panel 24A that serves as a base panel, are joined together in a state in which the open end of the upper peripheral wall 22B and the open end of the lower peripheral wall 24B are fitted together, whereby the hollow case 12 is formed.

The portion (fitted portion) at which the end surface of the upper peripheral wall 22B and the end surface of the lower peripheral wall 24B are fitted together and joined forms a parting line PL. It should be noted that the upper peripheral wall 22B and the lower peripheral wall 24B may be welded together or fixed with screws. Also, the height of the upper peripheral wall 22B is set to be larger than the height of the lower peripheral wall 24B.

Figure 2A:
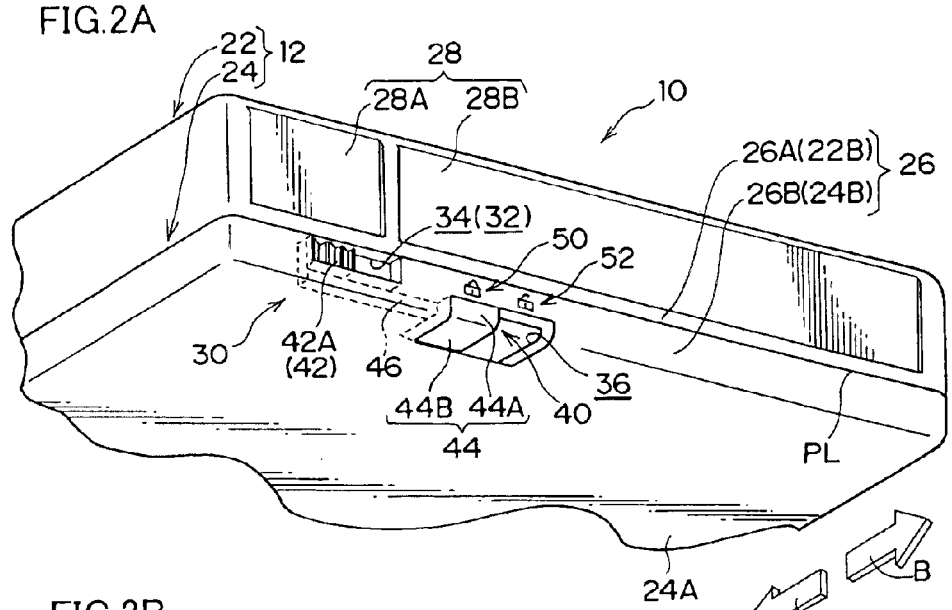
FIGS. 2A and 2B are views showing a label area and a write-protect portion of the recording tape cartridge pertaining to the embodiment of the invention, with FIG. 2A being an oblique perspective view showing a state in which it is not possible to record onto magnetic tape, and FIG. 2B being an oblique perspective view showing a recordable state.

As shown in FIG. 2A, a label area 28 and a write-protect portion 30 are disposed at a rear wall 26 that forms a rear surface of the case 12. The rear wall 26 comprises an upper rear wall 26A, which is part of the upper peripheral wall 22B and faces the direction of arrow B, and a lower rear wall 26B, which is part of the lower peripheral wall 24B and faces the direction of arrow B.

The label area 28 comprises an individual distinguishing label area 28A, which is disposed in the left end of the upper rear wall 26A, and a user label area 28B, which is adjacent to the right side of the individual distinguishing label area 28A and extends as far as a right end vicinity of the rear wall 26. Each of the individual distinguishing label area 28A and the user label area 28B is formed in a rectangular shape that is slightly recessed with respect to the outer surface of the upper rear wall 26A. An upper end of each of the individual distinguishing label area 28A and the user label area 28B opens upward toward a chamfered (rounded) corner where the upper rear wall 26A and the top panel 22A meet.

The write-protect portion 30 is disposed in the lower rear wall 26B. Specifically, as shown in FIG. 3, the write-protect portion 30 includes a cutout 32 where a vicinity of the left end of the lower rear wall 26B has been cut out in a rectangular shape from the parting line PL side. The open upper end of the cutout 32 is closed off by the lower end surface of the upper rear wall 26A, and the cutout 32 forms an operational hole 34 that serves as a second opening.

The write-protect portion 30 includes an identification opening 36 that opens rearward and downward and is formed in a corner of the lower case 24 where the lower rear wall 26B and the bottom panel 24A meet. The identification opening 36 is positioned slightly apart from and to the right of the operational hole 34, and the height of an upper edge of the identification opening 36 substantially corresponds to the height of the lower edge of the operational hole 34 (cutout 32). An inclined surface 36A corresponding to an identification portion 44 of a mistaken erasure prevention plug 40 described later is formed at an intermediate portion (region) in the plate thickness direction in the front edge of the identification opening 36.

Moreover, a pin 38 is vertically disposed in front of a left-right direction substantial center of the cutout 32 in the bottom panel 24A of the lower case 24. A tip of the pin 38 is elastically deformable in swinging directions to the left/right and front/rear of the case 12.

The portions of the case 12 at which the operational hole 34 and the identification opening 36 are disposed are partitioned off from an area at which the reel 16 is disposed by a free regulation wall (not illustrated) that regulates the freedom (play) of the reel 16, so that dust or the like entering through the operational hole 34 and the identification opening 36 does not adhere to the magnetic tape 14.

Also, the write-protect portion 30 includes the mistaken erasure prevention plug 40, which serves as a switching member. It should be noted that, when describing the mistaken erasure prevention plug 40 using the directions of front/rear, left/right, and upper/lower, the directions basically correspond to directions when the write-protect portion 30 is assembled to the case 12.

Figure 5:
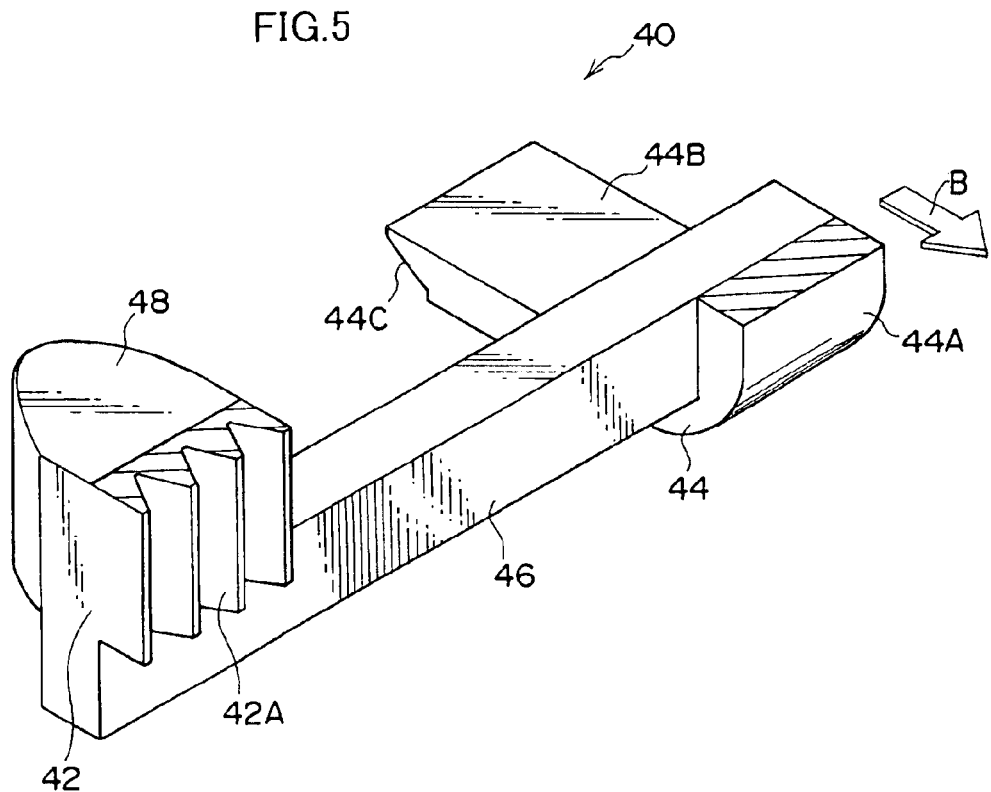
FIG. 5 is an oblique perspective view showing a mistaken erasure prevention plug that forms the write-protect portion of the recording tape cartridge pertaining to the embodiment of the invention.

As shown in FIG. 5, the mistaken erasure prevention plug 40 comprises: an operational portion 42, which is inserted into the operational hole 34 and is operated from the rear surface side of the case 12; the identification portion 44, which is inserted into the identification opening 36 and switches between a state in which recording onto the magnetic tape 14 is possible and a state in which recording onto the magnetic tape 14 is not possible; a connector 46 that connects the operational portion 42 with the identification portion 44; and a notch 48, which is formed in a mountain shape when seen in plan view, positioned at the front side of the operational portion 42, and abuts against the pin 38 when the operational portion 42 is moved in the left-right direction. The operational portion 42, the identification portion 44, the connector 46, and the notch 48 are integrally formed by resin-molding.

The height of the operational portion 42 corresponds to the opening height of the operational hole 34, and the width of the operational portion 42 is slightly smaller than half the opening width of the operational hole 34. A convexo-concave portion 42A, which is serrated when seen in plan view, is formed at a rear surface of the operational portion 42, so that operation thereof by the fingertip of a user is reliably effected.

The identification portion 44 is formed in a substantial L-shape when seen in side view, and closes off substantially half of the identification hole 36 in the width direction. That is, the width of the identification portion 44 is substantially half of the opening width of the identification opening 36. The portion of the identification portion 44 that is exposed from the rear surface side of the identification opening 36 is a rear surface side identification portion 44A, and the part of the identification portion 44 that is exposed from the lower surface side of the identification opening 36 is a lower surface side identification portion 44B. An inclined surface 44C, which is inclined in a front direction, is formed in a center of a front end (i.e., plate thickness portion) of the lower surface side identification portion 44B. An upper surface side of the lower surface side identification portion 44B extends in the front direction.

An upper end of the connector 46 corresponds to a lower end of the operational portion 42, to an upper end of the lower surface side identification portion 44B, and to an upper end of the rear surface side identification portion 44A. The connector 46 is disposed from a lower side of a portion of the operational portion 42 that does not enter the operational hole 42 to the front side of the rear surface side identification portion 44A.

That is, the portion of the operation portion 42 that projects further rearward than the connector 46 (i.e., the hatched portion in FIG. 5 that includes the convexo-concave portion 42A) suppresses rattling in the vertical direction between the lower edge of the cutout 32 and the lower end surface of the upper rear wall 26A. In the identification portion 44, the upper end surface (i.e., the hatched portion shown in FIG. 5) of the rear surface side identification portion 44A that is positioned further rearward than the connector 46 is regulated at the upper edge of the identification opening 36, and the inclined surface 44C slidably abuts against the inclined surface 36A, whereby chattering in the front-rear direction and in the vertical direction is regulated.

Figure 4:
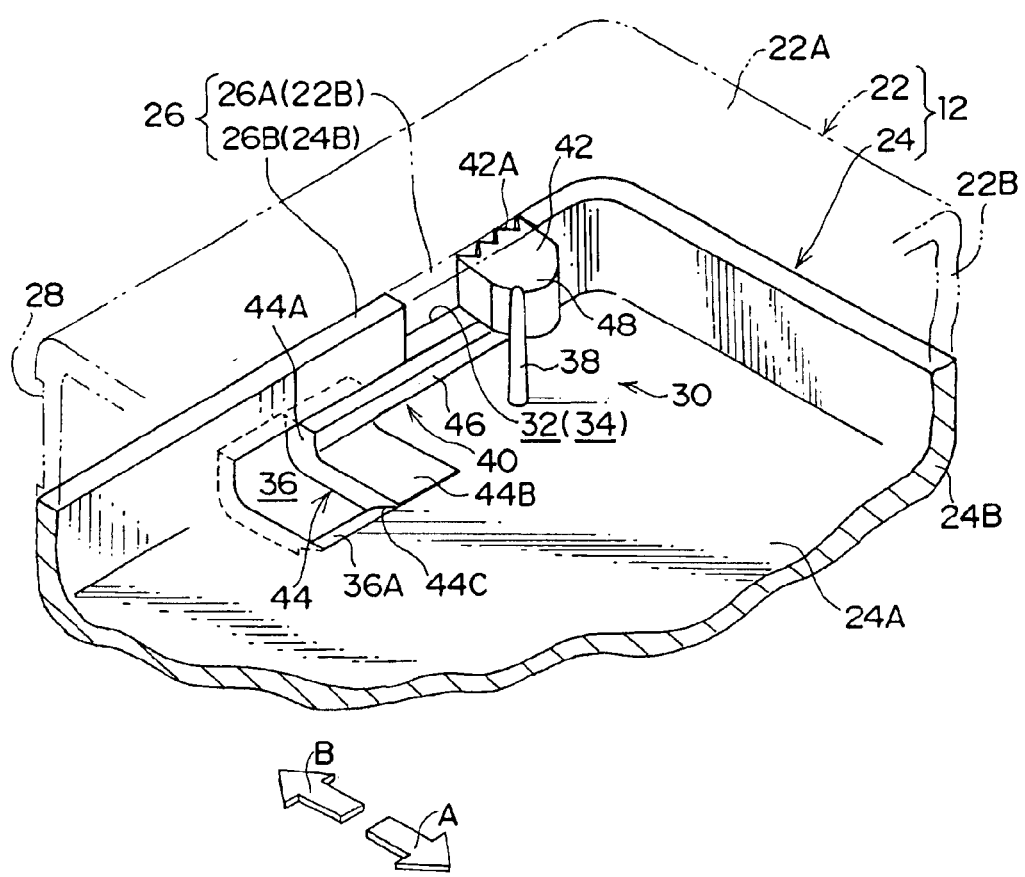
FIG. 4 is an exploded perspective view when the write-protect portion of the recording tape cartridge pertaining to the embodiment of the invention is seen from inside.
Figure 6:
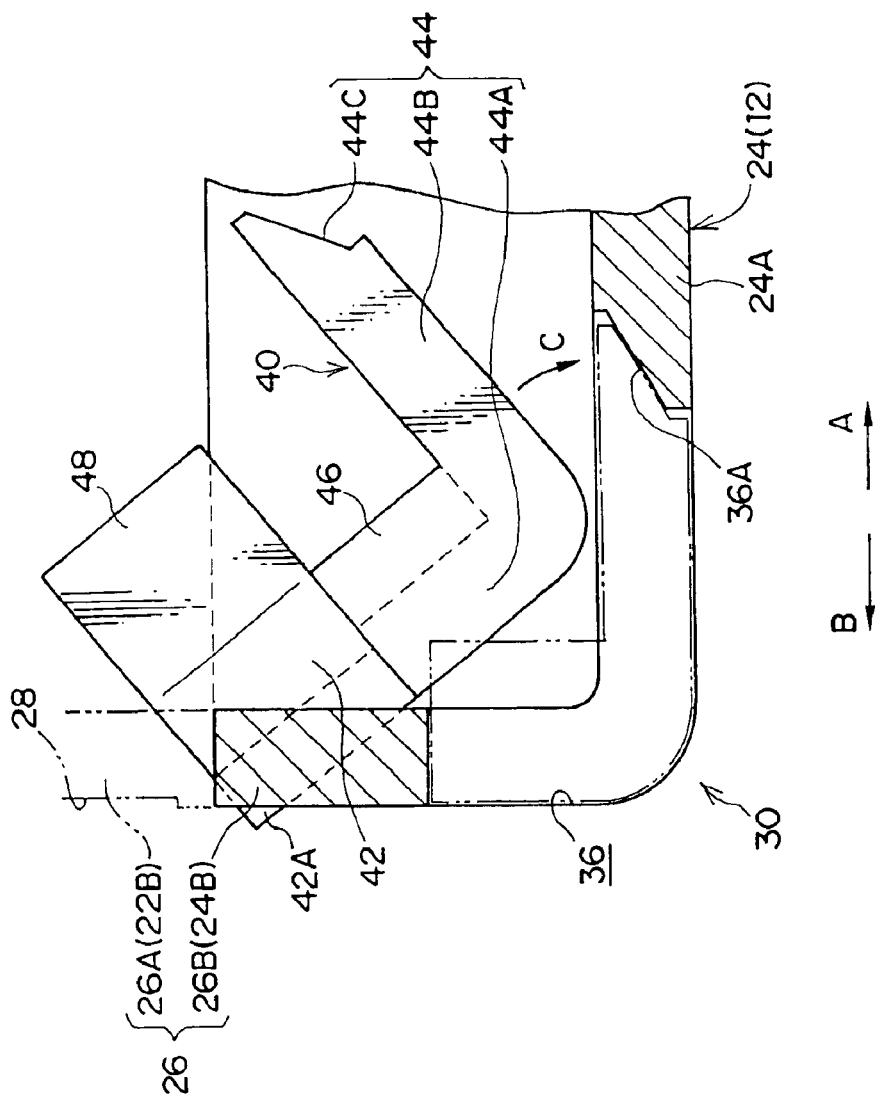
FIG. 6 is a side cross sectional view showing an assembly process of the mistaken erasure prevention plug that forms the write-protect portion of the recording tape cartridge pertaining to the embodiment of the invention.

The above-described mistaken erasure prevention plug 40 is assembled to the case 12 as shown in FIG. 4 and forms the write-protect portion 30. At the time of this assembly, as shown in FIG. 6, the mistaken erasure prevention plug 40 is disposed so that the rear surface side identification portion 44A faces diagonally downward. The mistaken erasure prevention plug 40 is rotated in the direction of arrow C and approaches the identification opening 36, whereby the identification portion 44 is inserted into the identification opening 36. Because the inclined surface 36A, which corresponds to the inclined surface 44C, is disposed at the identification opening 36 so that the identification opening 36 is enlarged toward the interior of the case 12, the identification portion 44 is smoothly inserted into the identification opening 36. At this time, the connecting portion 46 elastically deforms a little in a twisting direction and after assembly returns to the initial state.

In the write-protect portion 30, the rear surface side identification portion 44A becomes substantially even with the outer surface of the lower rear wall 26B, and dimensions of respective portions are determined such that the lower surface side identification portion 44B becomes substantially even with the lower surface of the bottom panel 24A. The corner of the identification portion 44 where the rear surface side identification portion 44A and the rear surface side identification portion 44B meet is formed as a curved surface with respect to the (rounded) corner of the lower case 24 formed as a curved surface between the lower rear wall 26B and the bottom panel 24A, and is rounded. Moreover, each outer surface (exposed surface) of the rear surface side identification portion 44A and the lower surface side identification portion 44B is shaped flat so that identification by mechanical or optical identification means described later is reliably effected.

Figure 2B:
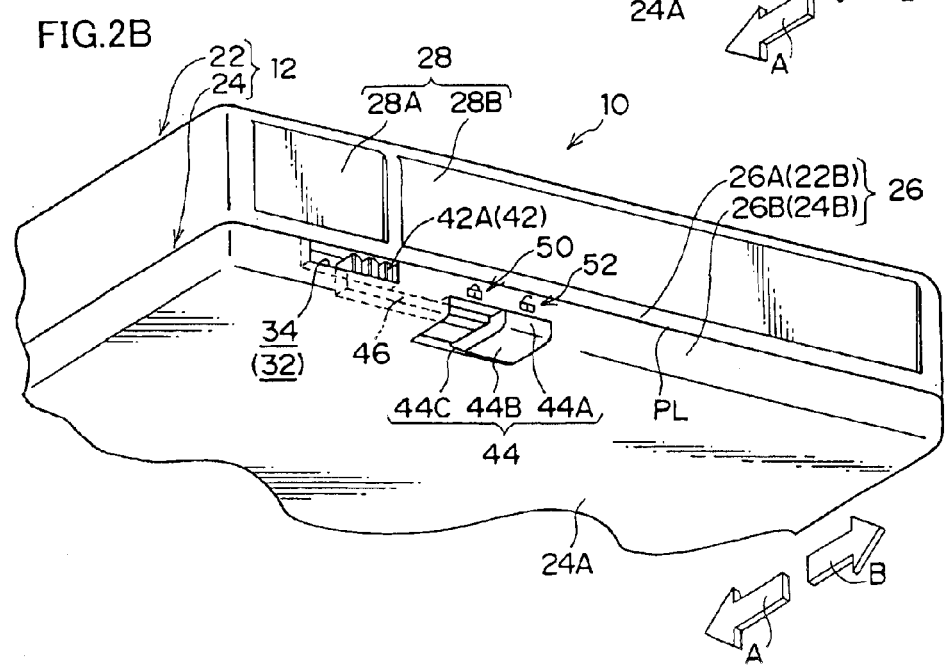

The dimensions of each portion in the write-protect portion 30 are determined such that the identification portion 44 closes off the substantial left half of the identification opening 36 when the operational portion 42 is positioned at the left end of the operational hole 34, as shown in FIG. 2A, and the identification portion 44 closes off the substantial right half of the identification opening 36 when the operational portion 42 is positioned at the right end of the operational hole 34, as shown in FIG. 2B.

In a state in which the identification portion 44 closes off the substantial left half of the identification opening 36, the cartridge 10 is in the non-recordable state in which it is not possible to record information onto the magnetic tape 14. Specifically, the state in which it is not possible to record onto the magnetic tape 14 is identified in a drive device 66 (described later) by an identification pin, which functions as mechanical identification means (both not illustrated), abutting against the lower surface side identification portion 44B or by optical identification means (not illustrated) detecting the lower surface side identification portion 44B.

That is, due to the fact that the substantial left half of the identification opening 36 is closed off by the identification portion 44, the mistaken erasure prevention plug 40 includes the function of making it impossible for the drive device 66 to record information onto the magnetic tape 14 and the function of allowing the drive device 66 to identify the non-recordable state (these two functions are basically inseparable).

In a state in which the identification portion 44 closes off the substantial right half of the identification opening 36, i.e., in a state in which the identification portion 44 opens the substantial left half of the identification opening 36, the identification pin or the optical identification means does not detect the lower surface side identification portion 44B, and the cartridge 10 is in the recordable state in which the drive device 66 is allowed to record information onto the magnetic tape 14.

In this manner, the mistaken erasure prevention plug 40 alternatively switches between the non-recordable state and the recordable state due to the identification portion 44 opening and closing off the substantial left half of the identification opening 36. That is, in the present embodiment, the identification portion 44 of the mistaken erasure prevention plug 40 substantially corresponds to a "switching member" in the invention.

A mark 50, which indicates that recording is not possible, is disposed at the left side of the lower rear wall 26B above the identification opening 36, and a mark 52, which indicates that recording is possible, is disposed at the right side of the lower rear wall 26B above the identification opening 36, so that the user does not mistakenly identify the non-recordable state or the recordable state (whether or not recording is possible). The mark 50 is a graphic representing a closed lock, and the mark 52 is a graphic representing an opened lock.

The switching by the mistaken erasure prevention plug 40 between the state in which it is possible to record onto the magnetic tape 14 and the state in which it is not possible to record onto the magnetic tape 14 is accomplished by moving the operational portion 42 left and right (in the longitudinal direction of the rear wall 26). In the mistaken erasure prevention plug 40, when the operational portion 42 is moved left and right, the notch 48 causes the pin 38 to elastically deform and crosses over the pin 38, allowing the user effecting the switching operation to realize the intermittent operational touch (feeling of restraint or feeling of the notch) and operational sound.

The substantial left half of the above-described identification opening 36 (the opening for switching between the state in which recording is possible and the state in which recording is not possible due to the identification portion 44 opening and closing off the opening) corresponds to a "first opening" and a "third opening" in the invention. That is, the identification opening 36 in the present embodiment comprises a structure in which an opening corresponding to the first opening disposed in the rear wall 26 and an opening corresponding to the third opening disposed in the bottom panel 24A are connectedly disposed.

Figure 7:
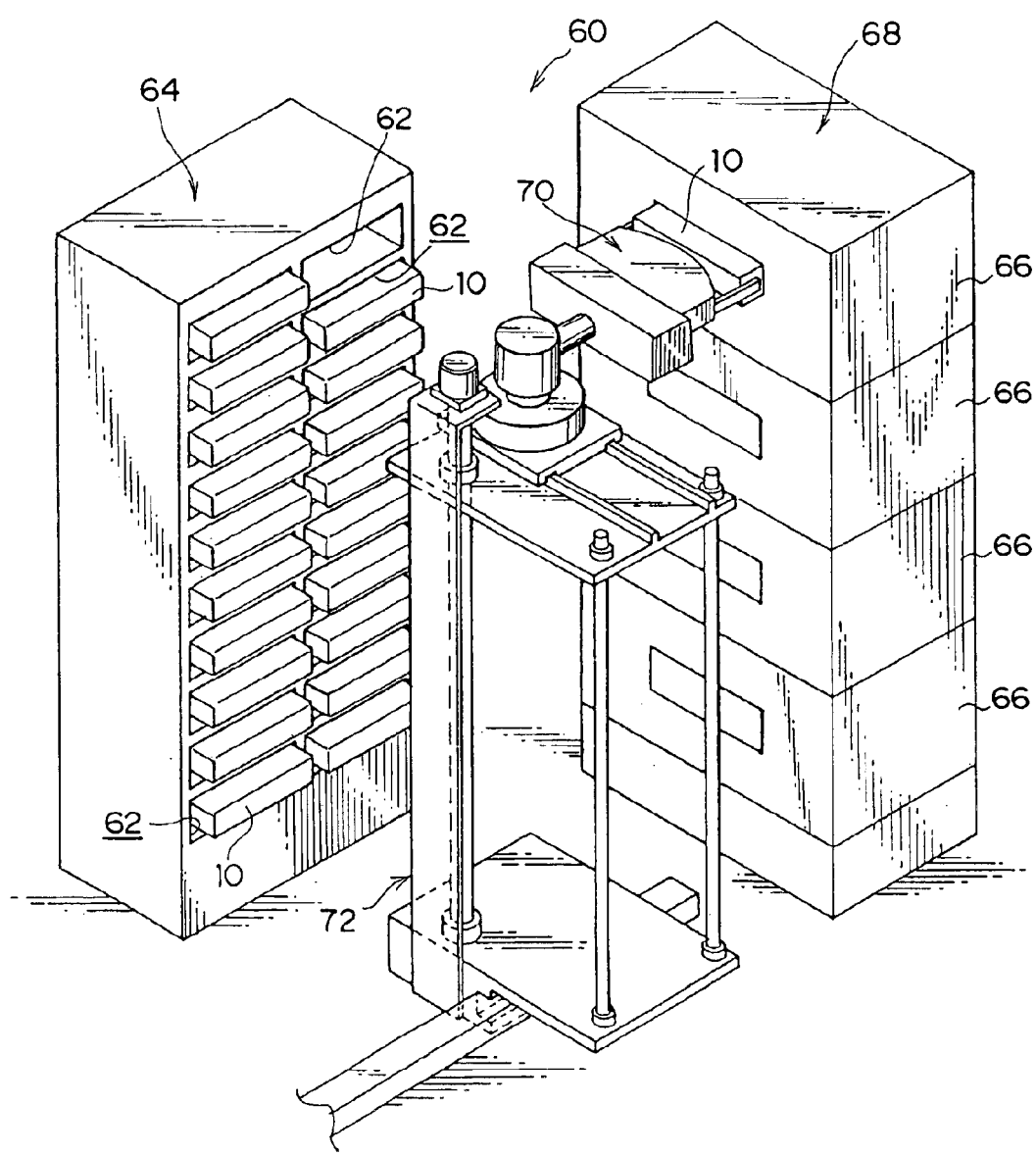
FIG. 7 is an oblique perspective view showing the overall schematic structure of a library device in which the recording tape cartridge pertaining to the embodiment of the invention is used.

Next, the structure of a library device 60, in which is used the recording tape cartridge 10, will be described. As shown in the schematic oblique perspective view of FIG. 7, the library device 60 is disposed with a housing shelf unit 64 that includes plural holders (magazines) 62 in which can be respectively housed the recording tape cartridge 10, a recording and playback unit 68 disposed several (four in the present embodiment) drive devices 66, and a moving mechanism 72 that can move a chucking mechanism 70 capable of grasping the rear end of the recording tape cartridge 10 between each holder 62 and each drive device 66.

In the library device 60, the recording tape cartridge 10 to be used is extracted from the holder 62 by the chucking mechanism 70 and the moving mechanism 72, and loaded into the drive device 66 of the recording and playback unit 68. After being used, the recording tape cartridge 10 is extracted from the drive device 66 by the chucking mechanism 70 and the moving mechanism 72, and then housed (loaded) in the holder 62 of the housing shelf unit 64.

Thus, plural (many) housed recording tape cartridges 10 can be automatically and rapidly loaded into and extracted from the drive device 66, and a large-scale (large-capacity) information backup system is constructed. The library device 60 handles many kinds of recording tape cartridges, and is disposed with drive devices 66 and holders 62 having different specifications corresponding to the many kinds of recording tape cartridges.

The mechanical or optical identification means is disposed in the library device 66 and identifies from below (lower surface side of) the recording tape cartridge 10 whether or not it is possible to record information onto the magnetic tape 14 (itself switches between the state in which recording onto the magnetic tape 14 is possible and the state in which recording onto the magnetic tape 14 is not possible).

Mechanical or optical identification means (not illustrated) is also disposed at the chucking mechanism 70, and identifies from behind (rear surface side of) the recording tape cartridge 10 whether or not it is possible to record information onto the magnetic tape 14. That is, in the library device 60, when the chucking mechanism 70 approaches the recording tape cartridge 10, the mechanical or optical identification means identifies from the rear side surface the closed off or open state of the substantial left half of the identification opening 36 in the identification portion 44 (rear side surface identification portion 44A).

Thus, in the library device 60, before the recording tape cartridge 10 is loaded into the drive device 66 (even if it is not loaded), it is possible for the drive device 66 to determine whether or not recording onto the magnetic tape 14 is possible.

Moreover, distinguishing means for distinguishing information (e.g., a barcode) on the label affixed to the individual distinguishing label area 28A is disposed at the chucking mechanism 70. On the basis of this information, the distinguishing means distinguishes the specifications and type (generation and recording capacity, or type and presence/absence of information recorded on the magnetic tape 14) of the recording tape cartridge 10. Thus, in the library device 60, the recording tape cartridge 10 can be loaded into the corresponding drive device 60.

Next, the action of the present embodiment will be described.

The recording tape cartridge 10 having the above-described structure is used in the library device 60. In the library device 60, plural recording tape cartridges 10 are respectively housed in the holders 62, and only rear ends of the recording tape cartridges 10 project from the holders 62.

In this state, the user operates the operational portion 42 as needed, and switches the states in which it is possible/impossible to record on the magnetic tape 14 while viewing the rear surface side identification portion 44.

In a case where is necessary to record information on the magnetic tape 14, when the chucking mechanism 70 approaches one of the recording tape cartridges 10 housed in the holders 62, the mechanical or optical identification means identifies whether or not it is possible to record on the magnetic tape 14. In a case where the recording tape cartridge 10 is in the non-recordable state, the chucking mechanism 70 approaches (moves toward) another recording tape cartridge 10 and identifies whether or not it is possible to record on the magnetic tape 14 of the other recording tape cartridge 10.

When the chucking mechanism 70 grasps the recording tape cartridge 10 that is in the recordable state, the recording tape cartridge 10 is loaded into the corresponding drive device 66 (capable of recording information) by the chucking mechanism 70 and the moving mechanism 72. In the drive device 66, because the recording tape cartridge 10 is in the recordable state, information is allowed to be recorded onto the magnetic tape (the fact that the recording tape cartridge 10 is in the recordable state is identified).

The sliding door 18 slides in accompaniment with the loading of the recording tape cartridge 10 into the drive device 66, the opening 12A is opened, and the lead pin 20 is pulled out by the pull-out means and accommodated at the take-up reel of the drive device 66. In this state, the take-up reel and the reel 16 are synchronously and rotatably driven, whereby the magnetic tape 14 is gradually pulled out from the case 12 while being taken up at the take-up reel. Information is recorded onto the magnetic tape 14 by a recording and playback head disposed along a predetermined tape path (see FIG. 1).

In a case where it is necessary to play back information recorded on the magnetic tape 14, it is not necessary to identify whether the recording tape cartridge 10 is in the recordable state or the non-recordable state, and the recording tape cartridge 10 is loaded into the corresponding drive device 66 by the chucking mechanism 70 and the moving mechanism 72. In a case where distinguishing information, such as the type and presence/absence of information recorded on the magnetic tape 14, is written on the label affixed to the individual distinguishing label area 28A, the distinguishing means distinguishes the distinguishing information, and the recording tape cartridge 10, on which the information needed for playback is recorded, is searched. Action thereafter is the same as in the case of recording, except that the recording and playback head plays back the information recorded on the magnetic tape 14.

Because the portion forming the write-protect portion 30 is not disposed on the rear surface of the upper rear wall 26A of the case 12, on which rear surface the label area 28 (the individual distinguishing label area 28A and the user label area 28B) is disposed, it is possible to obtain a label area extending across the substantially entire width of the upper rear wall 26A. Also, because the width in which it is possible to dispose the label area 28 is enlarged, the label area 29 can be divided into the individual distinguishing label area 28A and the user label area 28B, whose mutual functions (functions and types of labels to be affixed) differ.

Because the height of the upper rear wall 26A is higher than the height of the lower rear wall 26B, there is no increase in the thickness of the overall case 12 and it is even possible to increase the height of the label area 28. Moreover, because the label area 28 is not placed across the parting line PL and can be formed flatly without a step, it is possible to improve the ability with which a label affixed thereto can be written and read.

In the write-protect portion 30, the rear surface side identification portion 44A of the mistaken erasure prevention plug 40 is exposed to the rear surface side from identification opening 36 across the lower rear wall 26B, and the operational portion 42 is exposed to the rear surface side from the cutout 32 (operational hole 34) disposed in the lower rear wall 26B. Therefore, by viewing the rear surface side identification portion 44A from the rear surface side of the case 12, the user can identify whether or not it is possible to record on the magnetic tape 14 due to the switched state resulting from the mistaken erasure prevention plug 40. The user can also operate the operational portion 42 from the rear surface side of the case 12, and by this operation can switch between the state in which it is possible to record onto the magnetic tape 14 and the tape in which it is not possible to record onto the magnetic tape 14.

Thus, the user can identify whether or not it is possible to record onto the magnetic tape 14 (switched state) and can switch between the recordable and non-recordable states, even in a state in which the recording tape cartridge 10 is housed in the holder 62 of the library device 60, e.g., even in a state in which the recording tape cartridges 10 are stacked in a thickness direction of the cases 12.

Because the identification portion 44 of the mistaken erasure prevention plug 40 is inserted into the identification opening 36 formed in the corner of the lower case 24 where the lower rear wall 26B and the bottom panel 24A meet, the area of the identification portion 44 viewed from the rear surface side of the case 12 is increased only by the amount of the thickness of the bottom panel 24A, and the ability with which the identification portion 44 can be viewed from the rear surface side is improved.

In this manner, in the recording tape cartridge 10 pertaining to the embodiment of the invention, it is possible to confirm the switched state of the write-protect portion 30 from the rear surface of the case 12, to switch the switched state between the state in which it is possible to record on the magnetic tape 14 and the state in which it is not possible to record on the magnetic tape 14 by operation from the rear surface side of the case 12, and to enlarge the length of the label area 28 disposed on the rear surface of the case 12.

Because the mistaken erasure prevention plug 40 is guided by the upper and lower edges of the operational hole 34 due to the operational portion 42 being inserted into the operational hole 34 and is guided by the inclined surface 36A and the upper edge of the identification opening 36 due to the identification portion 44 being inserted into the identification opening 36, the height dimension becomes equal to the height of the lower rear wall 26B, and the mistaken erasure prevention plug 40 can be made smaller.

Thus, resin material necessary to mold the mistaken erasure prevention plug 40 and costs associated therewith can be reduced. A wall on the case 12 for guiding the mistaken erasure prevention plug 40 is unnecessary, and separation resistance at the time of molding is reduced, which is preferable.

Moreover, in the recording tape cartridge 10, because it is possible to identify the switched state between the states in which it is possible or not possible to record onto the magnetic tape 14 from both of the rear surface side and the lower surface side of the identification opening 36, it is possible for the recording tape cartridge 10 to correspond to both the drive device 66, which identifies the switched state from the lower surface side of the recording tape cartridge 10, and the chucking mechanism 70, which identifies the switched state from the rear surface side of the recording tape cartridge 10.

In this manner, in the library device 60, it is possible to identify, before the recording tape cartridge 10 is loaded into the drive device 66, whether or not it is possible to record onto the magnetic tape 14 of the recording tape cartridge 10 without disposing identification means at each holder 62, by disposing the mechanical or optical identification means at the chucking mechanism 70, which can move between the holders 62. Thus, unnecessary loading and removal of the recording tape cartridge 10 into and from the drive device 66 is prevented, and processing time is shortened.

It is possible for the recording tape cartridge 10 to correspond to the drive device 66 that identifies the switched state from the rear surface side of the recording tape cartridge 10. That is, the recording tape cartridge 10 may be loaded into and removed from the drive device 66 by human hands and not limited to when it is used in the library device 60. In this case, the recording tape cartridge 10 can correspond to the drive device 66 in which the directions in which it is identified whether or not recording is possible differ, and it is also possible to improve the freedom with which the drive device 66 is designed, by disposing a function that allows the write-protect portion 30 to identify from the rear surface side whether or not recording is possible.

Next, modified examples of the embodiment will be described. Parts and portions that are basically the same as those in the embodiment will be given the same reference numerals, and description of those parts and portions will be omitted.

Figure 8:
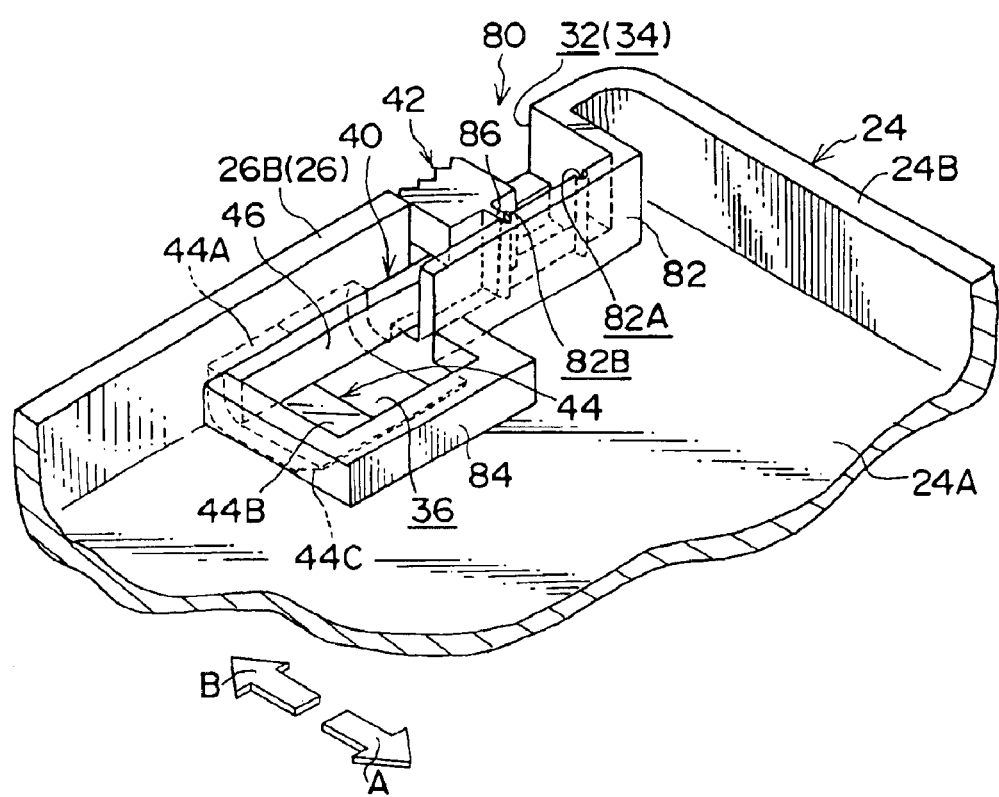
FIG. 8 is an oblique perspective view when a write-protect portion pertaining to a first modified example of the recording tape cartridge pertaining to the embodiment of the invention is seen from inside.

In FIG. 8, a write-protect portion 80 pertaining to a first modified example is illustrated in an oblique perspective view. As shown in the drawing, vertical walls 82 and 84 are vertically disposed around the cutout 32 and the identification opening 36, which form the write-protect portion 80, respectively. The vertical walls 82 and 84 are for improving the rigidity of the case 12, and because the vertical walls 82 are also disposed at the upper case 22 and mutual end surfaces abut against each other, a labyrinthine structure is formed in front of the cutout 32. Thus, the pair of upper and lower vertical walls 82 also function to prevent the entry of dust.

In place of the pin 38, the write-protect portion 80 includes two recesses 82A and 82B, which are disposed at the vertical walls 82 and apart from each other in the left-right direction. In place of the notch 48, the mistaken erasure prevention plug 40 includes a notch piece 86. The notch piece 86 is elastically deformable in swinging direction to the left/right. In the non-recordable state, a tip end of the notch piece 86 is inserted into the left-side recess 82A, and in the recordable state, the tip end of the notch piece 86 is inserted into the right-side recess 82B. Thus, the notch piece 86 is gradually deformed in accompaniment with the movement operation of the operational portion 42 and advances toward the recesses 82A and 82B, allowing the user to realize the intermittent operational touch (feeling of restraint).

In the structure pertaining to the first modified example, exactly the same effects as those in the embodiment can be obtained. Moreover, the rigidity and ability of the case 12 to prevent the entry of dust are improved.

Figure 9:
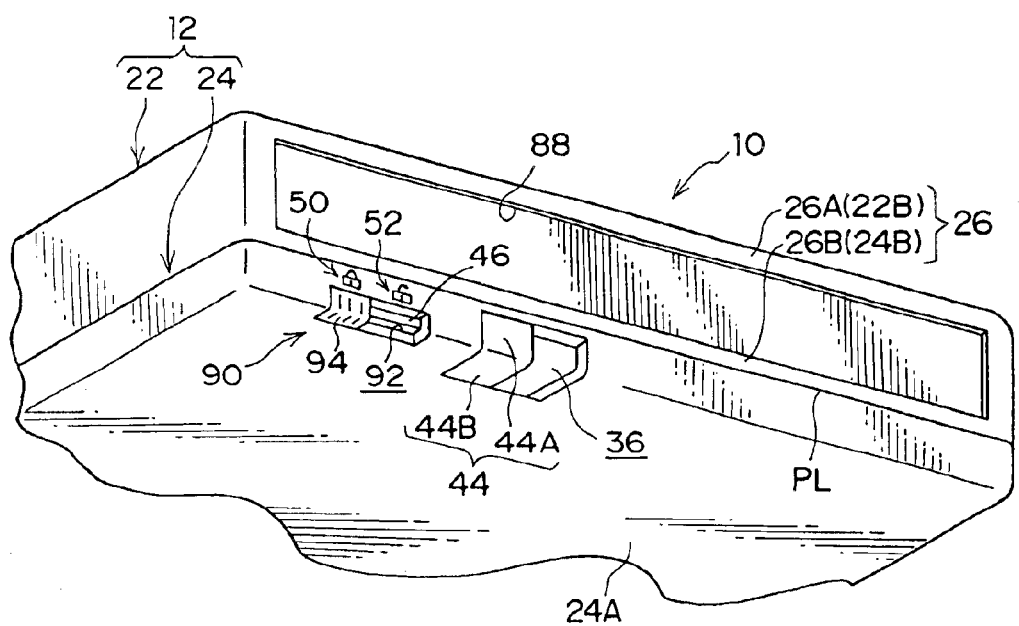
FIG. 9 is an oblique perspective view showing a label area and a write-protect portion pertaining to a second modified example of the recording tape cartridge pertaining to the embodiment of the invention.
Figure 10A:
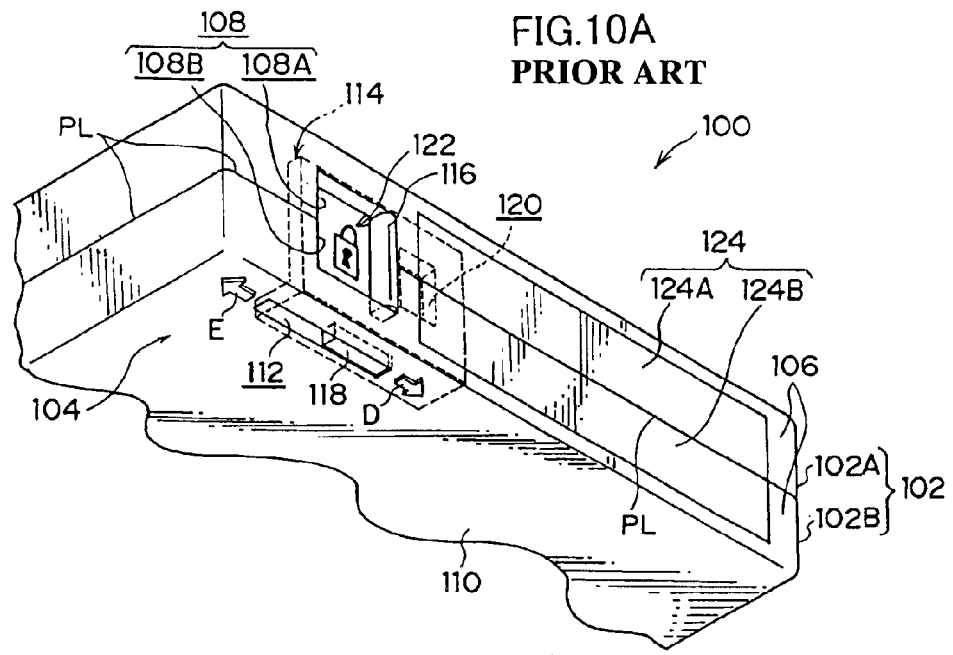
FIGS. 10A and 10B are views showing a write-protect portion and a label area in a conventional recording tape cartridge, with FIG. 10A being an oblique perspective view showing a state in which it is not possible to record onto magnetic tape, and FIG. 10B being an oblique perspective view showing a recordable state.
Figure 10B:
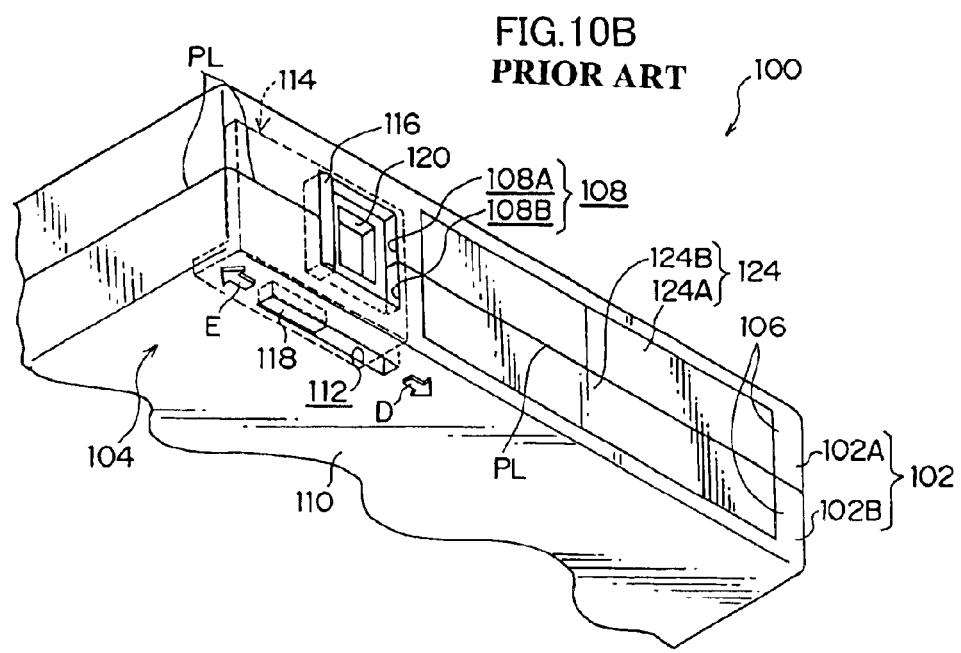

In FIG. 9, a label area 88 and a write-protect portion 90 pertaining to a second modified example are illustrated in an oblique perspective view. As shown in the drawing, the label area 88 is formed without break across the substantial entire width of the rear wall 26, and an upper end thereof is closed off by the upper rear wall 26A.

In place of the operational hole 34, the write-protect portion 90 includes an operational hole 92 as a second opening. The operational hole 92 is formed at a corner of the lower case 24 where the lower rear wall 26B and the bottom panel 24A meet, and opens downward. In place of the operational portion 42, an operational portion 94 that is disposed at the mistaken erasure prevention plug 40 is inserted into the operational hole 92. Also, in the write-protect portion 90, the mark 50 indicating that recording is not possible and the mark 52 indicating that recording is possible are disposed above the operational hole 92 in the lower rear wall 26B.

In the structure pertaining to the second modified example, exactly the same effects as those in the embodiment can be obtained. Moreover, the operational portion 92 is easy to operate. It goes without saying that modified examples, in which the label area 88 and the write-protect portion 90 are respectively independent, also can be provided.

In the embodiment and in each of the modified examples, a preferable structure was described in which the identification portion 44 of the mistaken erasure prevention plug 40 is inserted into the identification opening 36 so that its outer surface becomes substantially even with the outer surface of the case 12. However, the invention is not limited to the same. For example, the invention may be configured so that one or both of the rear surface side identification portion 44A and the lower surface side identification portion 44B slidably contacts the inner surface of the case 12 and opens and closes off the substantial left half of the identification opening 36 from the inside. In a structure in which both contact the inner surface of the case 12, it suffices if only a portion corresponding to the substantial left half of the identification opening 36 is disposed.

In the embodiment and in each of the modified examples, a structure was described in which the recording tape cartridge 10 becomes non-recordable in a state in which the identification portion 44 closes off the substantial left half of the identification opening 36. However, the invention is not limited to the same. It goes without saying that the invention may also be configured so that the recording tape cartridge 10 becomes non-recordable in a state in which the identification portion 44 closes off the substantial right half of the identification opening 36.

Moreover, in the embodiment and in each of the modified examples, a preferable structure was described in which the identification opening 36, which opens in the rear wall 26 and the bottom panel 24A of the case 12 so as to form a continuous and single opening, is disposed. However, the invention is not limited to the same. For example, the invention may be configured so that the first opening which opens in the rear wall 26 and the third opening which opens in the bottom panel 24A are separately disposed. The invention may be configured so that the position of the third opening is set to a position shareable with an opening for switching between the recordable and non-recordable states in existing recording tape cartridges, whereby it is also possible to improve common use of drive devices.

Moreover, in the embodiment and in each of the modified examples, structures were described in which the label areas 28 and 88 were disposed in the upper rear wall 26A and the operational holes 34 and 92 and part of the identification opening 36 were disposed in the lower rear wall 26B. However, the invention is not limited to the same. The invention may be configured so that the label areas 28 and 88 are disposed in the lower rear wall 26B and the operational holes 34 and 92 and part of the identification opening 36 are disposed in the upper rear wall 26A. In this case, it is preferable for the identification portion 44 of the mistaken erasure prevention plug 40 to be able to identify the switched state from the rear surface side and the lower surface side. That is, even in a case where the first opening and second opening in the invention are disposed in the upper rear wall 26A of the upper case 22, it is preferable to dispose the third opening in the lower panel 24A.

Moreover, in the embodiment and in each of the modified examples, a structure was described in which both of the mark 50 indicating that recording is impossible and the mark 52 indicating that recording is possible are disposed at the write-protect portions 30, 80, and 90. However, the present invention is not limited to the same. The invention may be configured so that only the mark 50 indicating that recording is impossible is disposed.

Moreover, in the embodiment and in each of the modified examples, structures were described in which the label areas 28 and 88 are disposed in the upper rear wall 26A. However, the present invention is not limited to the same. The invention may be configured so that the label areas 28 and 88 are disposed connectedly with a label area of the top panel 22A.

Moreover, in the embodiment and in each of the modified examples, a preferable structure was described in which undercuts are not formed on the lower case 24 when molding the operational holes 34 and 92. However, the present invention is not limited to the same. The invention may be configured so that, for example, an operational hole that passes only through the lower rear wall 26B is disposed using a slide core.

Moreover, in the embodiment and in each of the modified examples, the recording tape cartridge 10, in which a single reel wound with the magnetic tape 14 is housed in the case 12, was given as an example of the cartridge of the invention. However, the invention is not limited to the same. The cartridge of the invention may also be applied to a two-reel recording tape cartridge in which two reels for the magnetic tape 14, a take-off reel and a take-up reel, are housed within the case 12, or to a disc cartridge in which a disc medium, such as an optical disc or a magnetic disc, is rotatably housed within the case 12.

As described above, the cartridge pertaining to the invention has remarkable effects in that it is possible to visually confirm from a rear surface of a case whether information can be recorded on a recording medium, to switch between a state in which it is possible to record information on the recording medium and a state in which it is not possible to record information on the recording medium, by operation from a rear surface side of the case, and to increase the length of a label area disposed on the rear surface of the case.

What is claimed is:

1. A recording medium cartridge for housing a recording medium, being used by being loaded into a drive device from a predetermined direction, and alternatively including a mode in which recording onto the recording medium is possible and a mode in which recording onto the recording medium is prohibited, the recording medium cartridge
including a cartridge case that is substantially formed from an upper case and a lower case that respectively include a base panel and a wall enclosing a periphery of the base panel, with the walls of the upper case and the lower case being mutually joined together to house therein the recording medium, and rear sides, with respect to said predetermined direction, of the walls of the upper case and the lower case, having a substantially rectangular shape including a predetermined width and respective predetermined heights, wherein one of the upper case and the lower case includes
a first opening formed in a rear side wall thereof,
a second opening formed in the rear side wall thereof apart from the first opening in a width direction,
a third opening formed in the base panel thereof,
a switching member that is disposed in the first and third openings so as to be movable in the width direction and switches open and closed states of the first and third openings depending on positions of the switching member, and
an operational member that is disposed connectedly with the switching member so that an operation in which said operational member is moved from the outside is possible, and exposed through the second opening,
whereby the modes can be identified by the open and closed states of the first and third openings being distinguished from the outside;
wherein the first and third openings are continuous and form a single opening.

2. The recording medium cartridge of claim 1, wherein a surface that is recessed in a substantially rectangular shape is formed in the rear side wall of the other of the upper case and the lower case, and a label is affixable to the recessed surface.

3. The recording medium cartridge of claim 1, wherein the height of the wall of the other of the upper case and the lower case is greater than the height of the wall of the one of the upper case and the lower case.

4. The recording medium cartridge of claim 1, wherein the third opening is formed in the base panel of the lower case.

5. The recording medium cartridge of claim 1, wherein the one of the upper case and the lower case includes a cutout and is joined together with the other of the upper case and the lower case to thereby form the second opening.

6. The recording medium cartridge of claim 1, wherein the second opening is formed at a boundary between the rear side wall and the base panel, and part of the second opening is included in the base panel.

7. The recording medium cartridge of claim 1, wherein marks representing the modes are formed near at least one of the first and third openings to correspond to the positions of the switching member.

8. The recording medium cartridge of claim 1, wherein marks representing the modes are formed near the second opening to correspond to the positions of the switching member.

9. The recording medium cartridge of claim 1, wherein the one of the upper case and the lower case includes a rib that is continuous with the rear side wall and extends into the case from the second opening.

10. The recording medium cartridge of claim 1, wherein the switching member and the operational member are integrally formed.

11. The recording medium cartridge of claim 1, wherein the switching member is disposed so as to block off at least part of each of the first and third openings.

12. The recording medium cartridge of claim 1, wherein the length in the width direction of the switching member is shorter than the length in the width direction of the first and third openings, and one end side or another end side in the width direction of the first and third openings is closed off by moving the switching member in the width direction.

13. The recording medium cartridge of claim 1, wherein the first and third openings include an edge that extends in the width direction, and the switching member includes a structure that fits together with the edge and slides along the edge.

14. The recording medium cartridge of claim 1, wherein the second opening includes an edge that extends in the width direction, and the operational member is attached so as to be slideable along the edge.

15. The recording medium cartridge of claim 1, wherein the switching member includes an outer surface exposed to the outside of the case, and the outer surface provides a surface that is substantially even with an outer surface of the one of the upper case and the lower case.

16. The recording medium cartridge of claim 1, wherein the switching member includes an outer surface exposed to the outside of the case, and at least part of the outer surface slides on an inner surface of the one of the upper case and the lower case.

17. A recording medium cartridge for housing a recording medium, being used by being loaded into a drive device from a predetermined direction, and alternatively including a mode in which recording onto the recording medium is possible and a mode in which recording onto the recording medium is prohibited, the recording medium cartridge including a cartridge case that is substantially formed from an upper case and a lower case that respectively include a base panel and a wall enclosing a periphery of the base panel, with the walls of the upper case and the lower case being mutually joined together to house therein the recording medium, and rear sides, with respect to said predetermined direction, of the walls of the upper case and the lower case, having a substantially rectangular shape including a predetermined width and respective predetermined heights, wherein one of the upper case and the lower case includes a first opening formed in a rear side wall thereof, a second opening formed in the rear side wall thereof apart from the first opening in a width direction, a third opening formed in the base panel thereof, a switching member that is disposed in the first and third openings so as to be movable in the width direction and switches open and closed states of the first and third openings depending on positions of the switching member, and an operational member that is disposed connectedly with the switching member so that an operation in which said operational member is moved from the outside is possible, and exposed through the second opening, whereby the modes can be identified by the open and closed states of the first and third openings being distinguished from the outside, wherein the first and third openings are formed apart from each other.

18. A recording medium cartridge for housing a recording medium, being used by being loaded into a drive device from a predetermined direction, and alternatively including a mode in which recording onto the recording medium is possible and a mode in which recording onto the recording medium is prohibited, the recording medium cartridge including a cartridge case that is substantially formed from an upper case and a lower case that respectively include a base panel and a wall enclosing a periphery of the base panel, with the walls of the upper case and the lower case being mutually joined together to house therein the recording medium, and rear sides, with respect to said predetermined direction, of the walls of the upper case and the lower case, having a substantially rectangular shape including a predetermined width and respective predetermined heights, wherein one of the upper case and the lower case includes a first opening formed in a rear side wall thereof, a second opening formed in the rear side wall thereof apart from the first opening in a width direction, a third opening formed in the base panel thereof, a switching member that is disposed in the first and third openings so as to be movable in the width direction and switches open and closed states of the first and third openings depending on positions of the switching member, and an operational member that is disposed connectedly with the switching member so that an operation in which said operational member is moved from the outside is possible, and exposed through the second opening, whereby the modes can be identified by the open and closed states of the first and third openings being distinguished from the outside, wherein an edge of the third opening that extends in the width direction includes a surface that inclines in a direction in which the third opening expands toward an inner side of the case, and the switching member includes a surface that abuts against the inclined surface.

19. A recording medium cartridge for housing a recording medium, being used by being loaded into a drive device from a predetermined direction, and alternatively including a mode in which recording onto the recording medium is possible and a mode in which recording onto the recording medium is prohibited, the recording medium cartridge including a cartridge case that is substantially formed from an upper case and a lower case, which respectively include a base panel and a wall enclosing a periphery of the base panel, with the walls of the upper case and the lower case being mutually joined together to house therein the recording medium, and rear sides, with respect to said predetermined direction, of the walls of the upper case and the lower case having a substantially rectangular shape including a predetermined width and respective predetermined heights, wherein one of the upper case and the lower case includes a first opening formed in a rear side wall thereof, a cutout formed in the rear side wall thereof apart from the first opening in a width direction, a third opening formed in the base panel thereof, a switching member that is disposed in the first and third openings so as to be movable in the width direction and switches open and closed states of the first and third openings depending on positions of the switching member, and an operational member that is disposed connectedly with the switching member so that an operation in which said operational member is moved from the outside is possible, and exposed through the cutout, whereby the modes can be identified by the open and closed states of the first and third openings being distinguished from the outside, wherein the first and third openings are continuous and form a single opening.

20. A recording medium cartridge for housing a recording medium, being used by being loaded into a drive device from a predetermined direction, and alternatively including a mode in which recording onto the recording medium is possible and a mode in which recording onto the recording medium is prohibited, the recording medium cartridge including a cartridge case that is substantially formed from an upper case and a lower case, which respectively include a base panel and a wall enclosing a periphery of the base panel, with the walls of the upper case and the lower case being mutually joined together to house therein the recording medium, and rear sides, with respect to said predetermined direction, of the walls of the upper case and the lower case having a substantially rectangular shape including a predetermined width and respective predetermined heights, the cartridge case including a first opening formed in a rear side wall of one of the upper case and the lower case, a second opening formed in the rear side wall of the one of the upper case and the lower case apart from the first opening in a width direction, a third opening formed in the base panel of the lower case, a switching member that is disposed in the first and third openings so as to be movable in the width direction and switches open and closed states of the first and third openings depending on positions of the switching member, and an operational member that is disposed connectedly with the switching member so that an operation in which said operational member is moved from the outside is possible, and exposed through the second opening, whereby the modes can be identified by the open and closed states of the first and third openings being distinguished from the outside, wherein the first and third openings are continuous and form a single opening.

* * * * *